United States Patent [19]

Sonenvald

[11] Patent Number: 5,697,567
[45] Date of Patent: Dec. 16, 1997

[54] CASTING REEL WITH A SPOOL AND A CASTING EDGE WITH A LINE GUIDE

[76] Inventor: Davorin Sonenvald, Franz Schoendoerferstrasse 17, A-3012 Wolfsgraben/Heimbautal, Austria

[21] Appl. No.: 565,795

[22] Filed: Dec. 1, 1995

[30] Foreign Application Priority Data

Dec. 1, 1994 [AT] Austria ................. GM 467/94

[51] Int. Cl.$^6$ ................................. A01K 89/015
[52] U.S. Cl. ....................... 242/322; 242/157 R
[58] Field of Search ..................... 242/224, 322, 242/157 R

[56] References Cited

U.S. PATENT DOCUMENTS

| | | | |
|---|---|---|---|
| 2,890,842 | 6/1959 | Rickard | 242/322 |
| 2,973,917 | 3/1961 | Flower | 242/224 X |
| 3,166,267 | 1/1965 | Rowe | 242/224 |
| 4,412,662 | 11/1983 | Rutecki | 242/157 R X |
| 4,856,730 | 8/1989 | Jorgensen | |

FOREIGN PATENT DOCUMENTS

| | | |
|---|---|---|
| 0179726 | 4/1986 | European Pat. Off. . |
| 957611 | 2/1957 | Germany . |
| 30364 | 8/1964 | Germany . |
| 1167108 | 10/1964 | Germany . |
| 4211145 | 10/1993 | Germany . |
| 1138215 | 10/1968 | United Kingdom ........ 242/322 X |

*Primary Examiner*—Daniel P. Stodola
*Assistant Examiner*—Emmanuel M. Marcelo
*Attorney, Agent, or Firm*—Herbert L. Lerner; Laurence A. Greenberg

[57] ABSTRACT

Line is paid out from a stationary spool and it is deflected to a direction parallel to the axis of the spool. The device, for instance a casting reel, includes a stationary spool carrying the line to be paid out. A casting edge member is disposed in fixed spaced relationship with the spool and it is rotatable about the spool axis. The casting edge member has a casting edge for deflecting line unwinding from the spool to the direction parallel to the longitudinal axis of the spool.

5 Claims, 4 Drawing Sheets

CASTING REEL WITH A SPOOL AND A CASTING EDGE WITH A LINE GUIDE

BACKGROUND OF THE INVENTION

Field of the invention

The invention relates to a device for paying out line from a stationary spool, in which the line wound up onto the spool can be deflected to a direction substantially parallel to the axis of the spool via a casting edge.

Such devices are contemplated particularly for fishing rods, in which a bait or a lure which is secured to the line is to be cast. To enable the longest possible casts, it is necessary to minimize friction as much as possible. Friction occurs by way of example at the casting edge over which the line slides on being cast. Payout speeds can typically reach between approximately 40 m/s and 60 m/s. The braking effect as a consequence of friction is thus not insignificant.

The resultant friction can be divided into two components. The first friction component is oriented in the direction of the line and is caused by the motion of the line in the casting direction over the casting edge and through the line guides.

The second friction component arises from the circumferential motion of the line moving along the casting edge as the line is paid out from the spool.

The first friction component, which will hereinafter be referred to as linear friction, has an approximately linearly increasing strength with increasing payout of line, since the deflection angle at the casting edge becomes larger.

The braking action resulting from the second friction component in the circumferential direction rises exponentially, however. As a result, the cast dies down beyond a certain distance, as a function of the casting energy introduced into the casting motion.

European Patent Disclosure EP-A 32 632 discloses a device of the type referred to at the outset in which a line can be paid out from a spool. In that device as well, the line must slide over at least one stationary casting edge, this resulting in the aforementioned disadvantages.

SUMMARY OF THE INVENTION

It is accordingly an object of the invention to provide a casting reel, which overcomes the above-mentioned disadvantages of the prior art devices and methods of this general type and which allows long and exact casts. As outlined above, the payout friction should be minimized as much as possible.

With the foregoing and other objects in view there is provided, in accordance with the invention, a device for paying out line, comprising:
- a stationary spool defining a longitudinal axis and the spool carrying line to be paid out;
- a casting edge member disposed in fixed spaced relationship with the spool and being rotatable about the axis of the spool, the casting edge member having a casting edge for deflecting line unwinding from the spool to a direction substantially parallel to the longitudinal axis of the spool.

In accordance with another feature of the invention, the device comprises means disposed between the casting edge member for reducing friction between the casting edge member and the spool so that the casting member is supported in low-friction fashion and the casting edge member may be rotationally accelerated with minimal friction loss.

In other words, the objects of the invention are solved in that the casting edge is provided on a member that is rotatable about the axis of the spool. As a result, at least the braking component in the circumferential direction can be avoided virtually entirely. The casting edge member is preferably supported with low friction, or in other words a high rotary speed can be attained with quite negligible friction loss.

In accordance with an added feature of the invention, the spool is formed with a winding cylinder on which the line is wound in layers and a shoulder formed laterally of the winding cylinder, the casting edge being defined on a outer circumferential edge of the shoulder. The casting edge member may be a rotatable ring rotatably supported on the outer circumferential edge of the shoulder.

The moment of inertia of the member carrying the casting edge can be minimized by providing that the member is embodied as a rotatable ring, which is supported on the outer circumference of a shoulder of the spool.

In accordance with an additional feature of the invention, the spool has an interior chamber defined therein, and including a shaft disposed in the interior chamber, and the casting edge member with the casting edge is a disk rotatably supported about the shaft. The disk is supported on a shaft which in turn is supported in the interior of the spool. In this way it is possible to minimize the danger of soiling.

The advantages of the above two embodiments can be combined especially advantageously by providing that the member carrying the casting edge is embodied as a disk which is supported on a shoulder of the spool. Therefore, in accordance with a further feature of the invention, the spool has a shoulder defined thereon, and the casting edge member is a disk rotatably supported on the shoulder of the spool.

In accordance with again another feature of the invention, the device includes a rotation startup aid disposed in the spool for setting the casting edge member into rotation at a beginning of a payout process, regardless of a force exerted by the line in a circumferential direction. The rotation startup aid is preferably a prestressing device which is prestressed during reeling in of the line. In the preferred embodiment, the prestressing device is a spring.

In the alternative, the rotation startup aid acts upon the casting edge member with any one of an electromagnetic field, a force of inertia of a rotating rotor (e.g. a free-wheeling wheel), and a gas turbine.

In accordance with again an added feature of the invention, the rotation startup aid is formed so as to set the casting edge member into rotation at least as early as simultaneously with a release of the line on casting or immediately prior to the release of the line on casting.

In accordance with yet an added feature of the invention, the casting edge has a guide formed thereon for guiding the line on the casting edge. In one embodiment the casting edge member is shaped as a drum, with the spool protruding part-way into the drum, and the casting edge member and the spool being couplable with a drive for rotating and axially oscillating the spool, for effecting ordered winding up the line in layers, and the line being guided via the line guide about the casting edge. It is particularly favorable if the member carrying the casting edge is embodied essentially in the shape of a drum, and if the member and the spool protruding part-way into this member can be coupled with a drive that is embodied to drive the member in rotation and to impart an oscillating motion in the axial direction to the spool, in order to enable winding up the line in ordered layers, the line being guided via the line guide of the casting edge.

In accordance with yet an additional feature of the invention, the casting edge member is brakable.

In accordance with a concomitant feature of the invention, the device further comprises a rotational body rotatably supported on the casting edge member. The rotational body is preferably a pulley about which the line is guided and which is rotatable about an axis which is skewed relative to the axis of the spool. In this way, the friction in the casting direction of the line can be minimized as well.

Other features which are considered as characteristic for the invention are set forth in the appended claims.

Although the invention is illustrated and described herein as embodied in a casting reel, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1A:
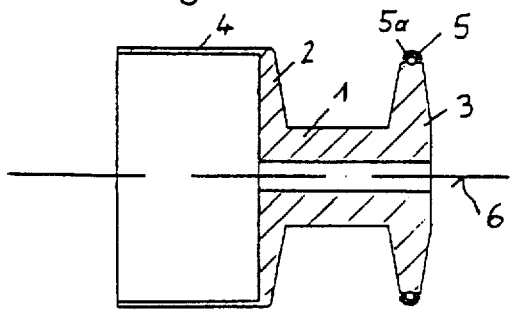
FIG. 1A is an axial section centrally through a first embodiment of the inventive reel.
Figure 1B:
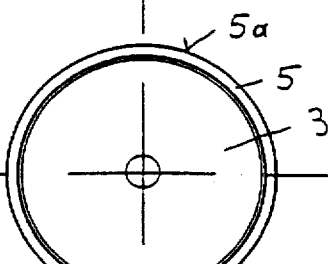
FIG. 1B is a plan view thereof as seen from a forward tip of a casting rod.

Referring now to the figures of the drawing in detail and first, particularly, to FIGS. 1A and 1B thereof, there is seen a spool 1 in the form of an H, with two shoulders 2 and 3 laterally formed thereon. The spool is thus defined with a winding cylinder and two shoulders laterally thereof. A cylindrical extension of the shoulder 2 forms a housing 4 for receiving a winding mechanism for winding up the line in ordered layers, to prevent uncontrolled tangling of the line. While the reel structure is hatched for metal, it should be understood that the spool and the shoulders may also be formed of suitable plastics. A ball-borne ring 5 is provided on the outer circumferential edge of the shoulder 3. The ring 5 thereby defines the casting edge 5a. When the line (not illustrated in FIG. 1A) is unwound from the spool 1 it is deflected via this ring 5 in a direction that is substantially parallel to an axis 6 of the spool 1. The ring 5, i.e. the structure carrying the casting edge of the reel, may be referred to as a casting edge member.

The first embodiment of FIG. 1A enables the member 5 carrying the deflection edge, i.e. the casting edge, at the beginning of the casting process to very rapidly reach a rotary speed that matches the speed of motion of the line in the circumferential direction, since the polar moment of inertia (rotary inertia) of the member 5 is minimal. A frictional force in the circumferential direction (a torque which counters the casting) therefore occurs only extremely briefly at the beginning of the casting process, until the member 5 has reached the necessary speed.

Figure 2A:
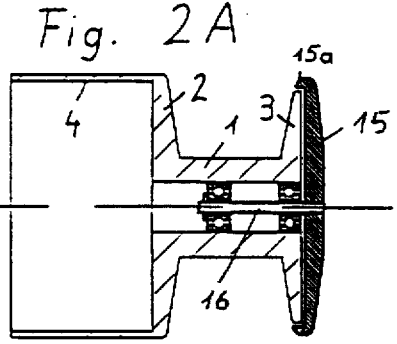
FIGS. 2A and 2B are views similar to FIGS. 1A and 1B, respectively, of a second embodiment.
Figure 2B:
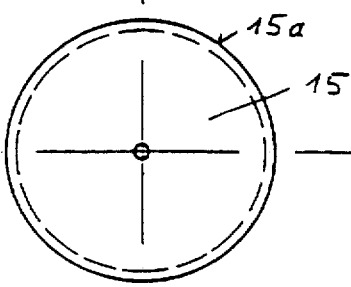

The second embodiment of FIGS. 2A and 2B differs from the above embodiment in that the member which carries the casting edge 15a is embodied as a disk 15, which is firmly connected to a shaft 16 that is supported in the interior of the spool 1. Since the disk 15 covers the entire end face of the spool, the danger of soiling and attendant functional impairment can largely be averted. The moment of inertia of the disk 15 is intrinsically greater than that of the ring 5, and thus the friction losses at the onset of the payout process are somewhat greater.

Figure 3A:
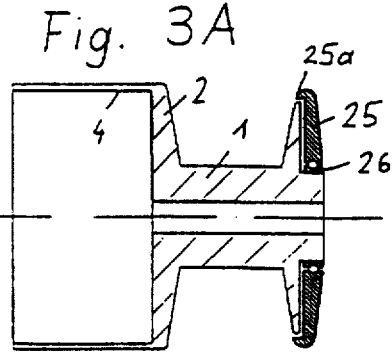
FIGS. 3A and 3B are similar views of a third embodiment.
Figure 3B:
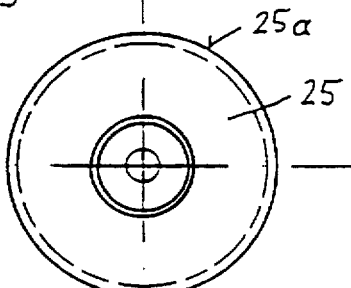

In the third embodiment of FIGS. 3A and 3B, the advantages of the above two embodiments can be combined. Here the disk 25 is a circular, annular washer which is supported on a step 26 formed on the spool 1.

Figure 4A:
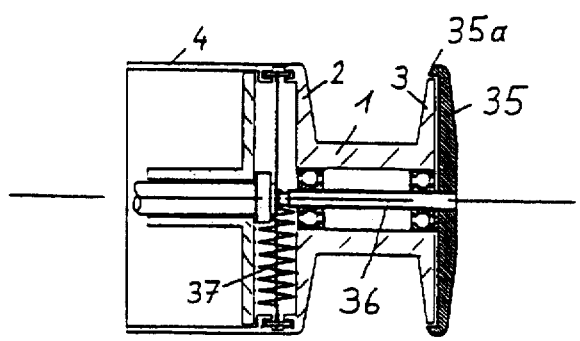
FIGS. 4A and 4B are similar views of a fourth embodiment.
Figure 4B:
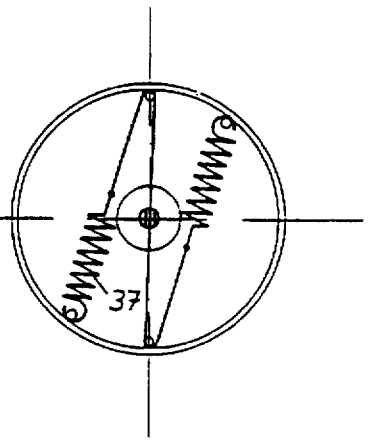

In order to avert friction losses in the circumferential direction entirely in the casting-off process, it is advantageous, by exerting external force, to accelerate the member carrying the casting edge, at the onset of the casting-off operation, to a rotary speed that is equivalent to the angular speed of the line in the circumferential direction. This rotary speed is generally between 10,000 and 20,000 rpm. One possible version of such a device is shown in FIGS. 4A and 4B. The shaft 36 to which the disk 35 is secured is connected to a spring 37, which is prestressed in the windup process, i.e. when the line is reeled in. With the release of the line at the onset of the casting operation, the spring is released as well, and as a result the disk 35 is set into rotation by the spring force.

Figure 5A:
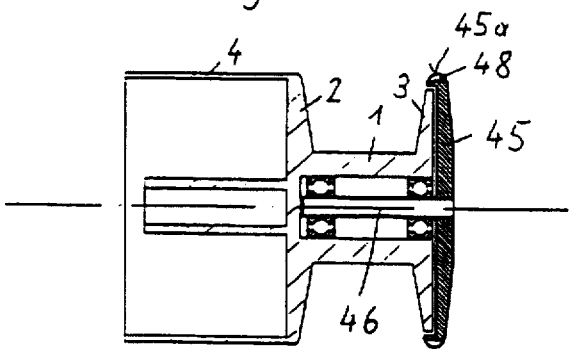
FIGS. 5A and 5B are similar views of a fifth embodiment.
Figure 5B:
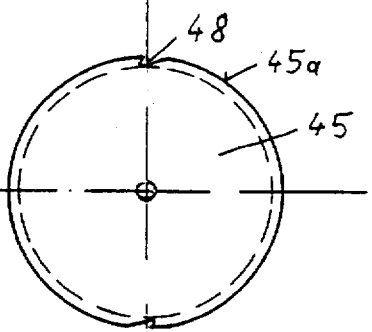

With reference to FIGS. 5A and 5B, the fifth embodiment is substantially equivalent to that of FIGS. 2A and 2B, except that guides 48 in the form of notches are provided on the circumference of the disk 45 at the casting edge 45a. These notches have a line-holding function; that is, the line is held in one of these notches before the casting operation is initiated. By means of a so-called trigger starting lever (not shown), the disk 45 is blocked and thus the line too is held in a prestressed position. As a result, it is possible in a very convenient way to accomplish an exact release of the line during the casting motion. In conventional stationary-spool reels this is done by holding the spool or the line with one finger.

As a result of the pulling force of the weight being cast, the payout of line takes place via this line guide, and as a result the disk 45 is necessarily accelerated to a rotary speed that is equivalent to the circumferential speed of the line. As a result, an immediate synchronization of the rotary speed of the disk 45 can be achieved. While admittedly this means a slight reduction in casting energy, nevertheless in fishing with lures it makes it possible to attain a controlled stretching of the line.

Figure 6B:
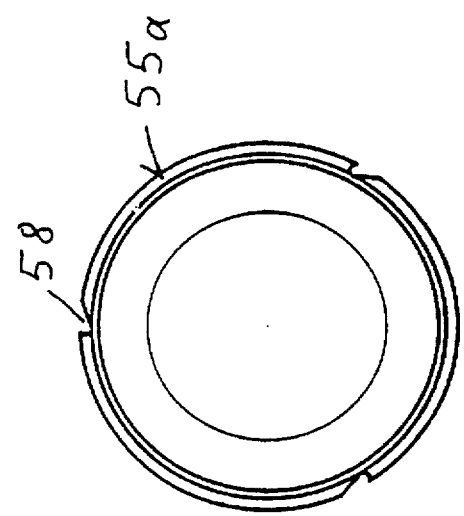
FIG. 6B is a plan view onto the reel of FIG. 6A, without the rod clamping mount.
Figure 6A:
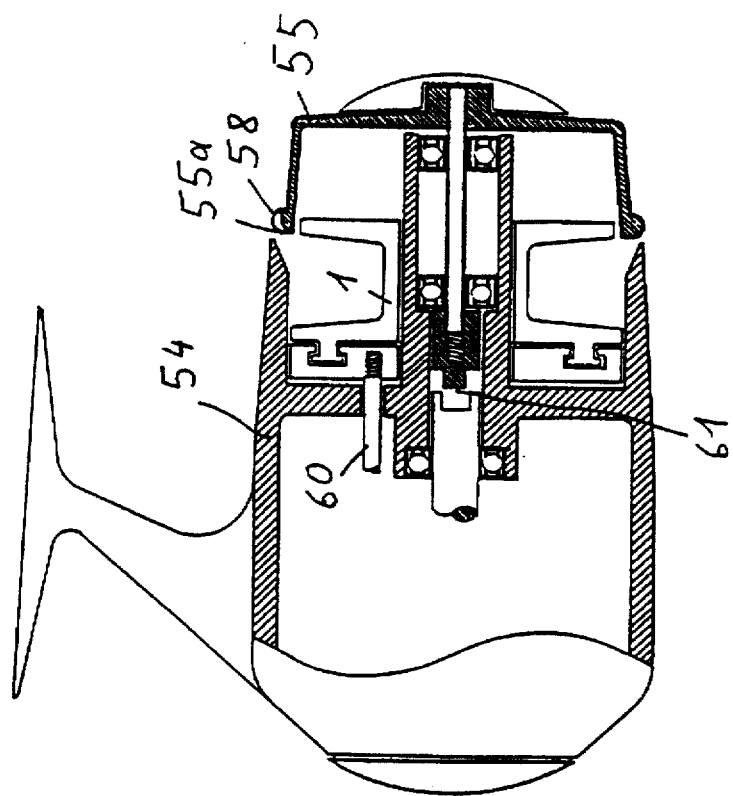
FIG. 6A is an axial section through a casting reel and a rod clamping mount.

FIGS. 6A and 6B show an embodiment with an integrated casting brake. A gear part (not shown in further detail), which serves to wind the line, is disposed in the housing 54 in a conventional manner. A reciprocating mechanism 60 causes an oscillatory axial motion of the spool 1, which makes it possible to wind up the line in ordered layers. In contrast to conventional stationary spool, as a result of the gear part it is not the bail that is rotated, but instead via a coupling 61 the disk 55 is rotated, which here is embodied in the form of a drum, and as a result the line traveling via the guide 58 is wound onto the spool. As a result, reeling in is possible without the rewinding bail that in prior art devices enables a uniform distribution of the line over the width of the spool.

Figure 7A:
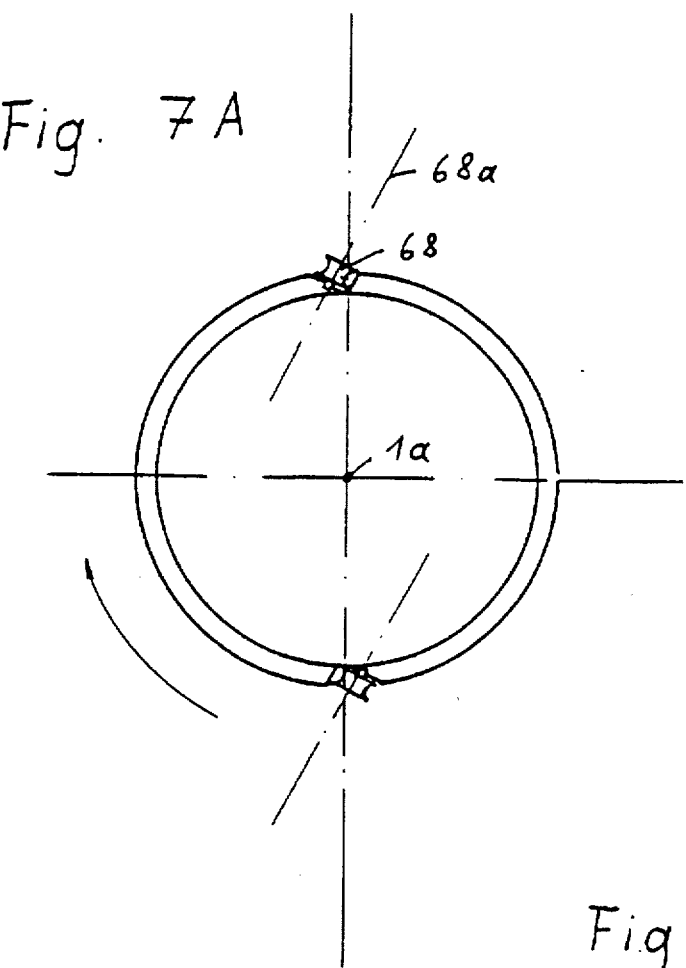
FIG. 7A is a plan view onto a further embodiment of the invention.
Figure 7B:
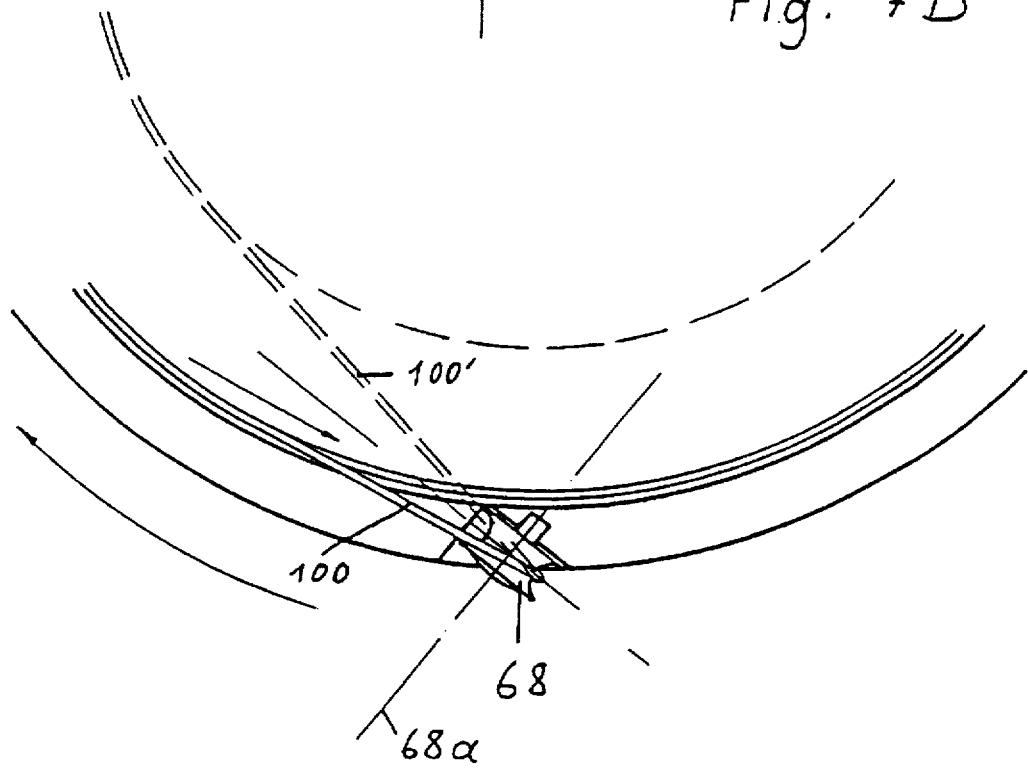
FIG. 7B is an enlarged view of a section of FIG. 7A.

FIGS. 7A and 7B show a further variation of the embodiments of FIGS. 5A, 5B and 6A, 6B. Here the line is guided over small rotational bodies 68—preferably in the form of pulleys or guide rollers—whose rotational axes 68a are skewed away from the axis 1a of the spool. In other words, the axes about which the pulleys rotate form an acute angle relative to the radial direction towards the axis 1a such that the rolling surface of the pulleys 68 approximately points towards the surface on the layered line (referred to as the cheese) from which the fishing line issues from the spool. The precise location of the axes 68a is determined such that the line 100 can be guided securely over the deflection rollers 68 both when the spool is full and when the spool is empty (line 100'), represented by dashed lines). As a result, a further reduction of the frictional forces is possible.

The novel device of the invention enables a marked improvement in the frictional behavior of the device, thus making longer and more accurate casts possible with only relative minor structural changes in conventional casting reels.

I claim:

1. A device for paying out line, comprising:
   a stationary spool defining a longitudinal axis and said spool carrying line to be paid out;
   a casting edge member disposed in fixed spaced relationship with said spool and being rotatable about said axis of said spool, said casting edge member having a casting edge for deflecting line unwinding from said spool to a direction substantially parallel to said longitudinal axis of said spool, and said casting edge having a guide formed therein for guiding the line on said casting edge, said guide being a notch defining a ramp in one circumferential direction around said casting edge and a hook in an opposite circumferential direction around said casting edge.

2. The device according to claim 1, which further comprises means disposed between said casting edge member for reducing friction between said casting edge member and said spool so that said casting member is supported in low-friction fashion and the casting edge member may be rotationally accelerated with minimal friction loss.

3. The device according to claim 1, wherein said spool is formed with a winding cylinder on which the line is wound in layers and a shoulder formed laterally of said winding cylinder, said casting edge being defined on an outer circumferential edge of said shoulder.

4. The device according to claim 1, wherein said spool has an interior chamber defined therein, and including a shaft disposed in said interior chamber, and said casting edge member with said casting edge is a disk rotatably supported about said shaft.

5. The device according to claim 1, wherein said spool has a shoulder defined thereon, and said casting edge member is a disk rotatably supported on said shoulder of said spool.

* * * * *